(12) United States Patent
Janes et al.

(10) Patent No.: US 7,937,717 B2
(45) Date of Patent: May 3, 2011

(54) METHOD AND APPARATUS ENABLING MULTIPLE APPLICATION SHARING OF CLASSES

(75) Inventors: Peter Edward Janes, London (CA); Jeffrey Ronald Wannamaker, London (CA); Jason Daniel Williams, London (CA)

(73) Assignee: TVWorks, LLC, Philadelphia, PA (US)

( * ) Notice: Subject to any disclaimer, the term of this patent is extended or adjusted under 35 U.S.C. 154(b) by 1711 days.

(21) Appl. No.: 10/939,768

(22) Filed: Sep. 13, 2004

(65) Prior Publication Data

US 2006/0059156 A1 Mar. 16, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................................ 719/332; 717/162

(58) Field of Classification Search .......... 719/331–332, 719/320; 717/162–167
See application file for complete search history.

(56) References Cited

U.S. PATENT DOCUMENTS

| 6,574,618 | B2* | 6/2003 | Eylon et al. ....................... 707/1 |
| 7,140,011 | B2* | 11/2006 | Hallford ........................ 717/165 |
| 7,171,674 | B2* | 1/2007 | Arrouye et al. ................ 719/331 |
| 7,389,515 | B1* | 6/2008 | Seth et al. ...................... 719/320 |
| 2002/0169791 | A1* | 11/2002 | Liang et al. ................... 707/200 |
| 2002/0194399 | A1* | 12/2002 | Asakura ........................ 709/331 |
| 2004/0117805 | A1* | 6/2004 | Czajkowski et al. ......... 719/331 |
| 2004/0123323 | A1* | 6/2004 | Russo ............................. 725/88 |
| 2004/0226031 | A1* | 11/2004 | Zimmerman et al. ........ 719/331 |
| 2005/0060725 | A1* | 3/2005 | D'Souza et al. .............. 719/331 |
| 2005/0198677 | A1* | 9/2005 | Lewis .............................. 725/87 |
| 2006/0095919 | A1* | 5/2006 | Shiomi et al. ................. 718/104 |

* cited by examiner

*Primary Examiner* — Diem K Cao
(74) *Attorney, Agent, or Firm* — Banner & Witcoff, Ltd.

(57) ABSTRACT

The invention comprises a method adapted to manage access to information elements such as classes, data files, objects and methods within a shared library by each of a plurality of applications operating within a respective context. Library contexts including requested information elements are instantiated as necessary for each access requesting application. Location information pertaining to the instantiated library contexts is added to a corresponding location parameter of the requesting applications.

22 Claims, 6 Drawing Sheets

METHOD AND APPARATUS ENABLING MULTIPLE APPLICATION SHARING OF CLASSES

BACKGROUND OF THE INVENTION

1. Field of the Invention

The present invention relates to data processing systems and, more particularly, to sharing library resources within a client device having multiple applications running within a Java virtual machine.

2. Description of the Related Art

In an environment such as a set top box (STB), memory and computational resources are typically constrained. This leads to a limit on the size of programs that can be executed. To reduce the memory necessary to support execution of a program, dynamically loadable and sharable class libraries have been implemented in operating systems such as Unix and Windows, as well as execution environments such as Java.

A shared library allows applications to share common code between the applications. A request for a program file (such as a class definition) is received by a class loader from an executing process (such as an application or applet within a Java Virtual Machine) external to a shared library. In response to receiving the request, the class loader loads the appropriate program file from the shared library. Since each of the applications is operating within a common context, each application may call methods from the common or shared library. Unfortunately, where applications are run in multiple or respective contexts, this direct calling of methods related to other applications does not work. In this case, the shared library must be compiled in its entirety for each application.

SUMMARY OF INVENTION

Various deficiencies associated with the prior art are addressed by the present invention of a method adapted to manage access to information elements such as classes, data files, objects and methods within a shared library by each of a plurality of applications operating within a respective context. Library contexts including requested information elements are instantiated as necessary for each access requesting application. Location information pertaining to the instantiated library contexts is added to a corresponding location parameter of the requesting applications. In one embodiment, the generation of new library contexts is handled by a library loader in communication with the requesting applications or applets.

A method according to one embodiment of the invention for enabling access to portions of a library shared by each of a plurality of applications comprises: receiving a request from an application for at least one information element in a shared library; storing said at least said one shared library information element in a library instance associated with the requesting application; and appending, to a location parameter associated with said requesting application, a location of said library instance.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
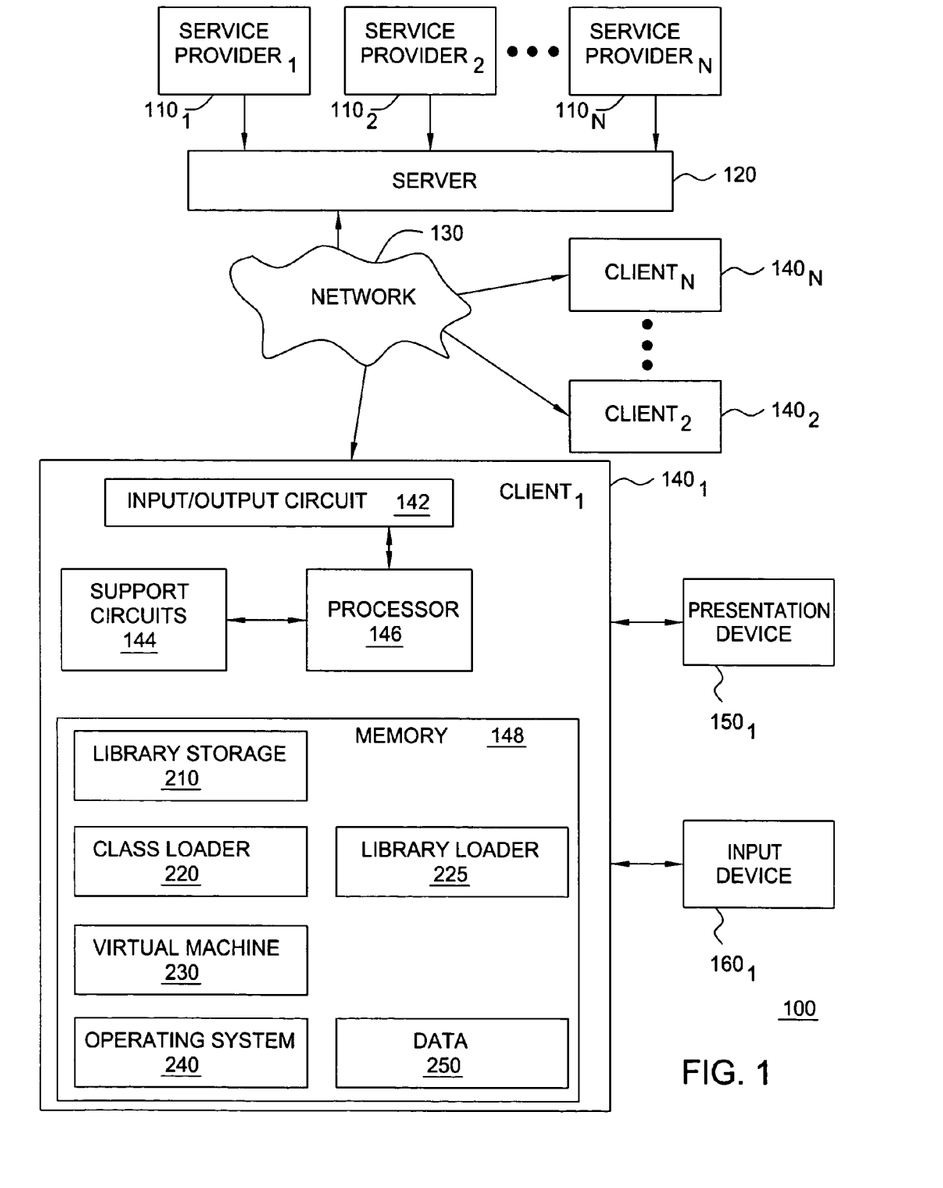
FIG. 1 depicts a high-level block diagram of an information distribution system suitable for use with the present invention.

FIG. 1 depicts a high-level block diagram of an information distribution system suitable for use with the present invention. Specifically, the information distribution system 100 of FIG. 1 is adapted to enable the distribution of various services, applications and/or content from corresponding service providers to any of a plurality of clients associated with the network. While the system 100 of FIG. 1 will be described as having a particular topology, it will be appreciated by those skilled in the art that other topologies may be advantageously used within the context of the present invention. Specifically, the number of service providers, types of servers, networks and clients utilized within the system 100 may be modified by those skilled in the art informed by the teachings of the present invention.

The information distribution system 100 of FIG. 1 comprises a plurality of service providers $110_1$ through $110_N$ (collectively service providers 110), a server 120, a network 130 and a plurality of clients $140_1$ through $140_N$ (collectively clients 140). Each of the clients 140 is normally associated with a presentation device 150, such as a television or other audiovisual display device or component(s) and input device 160, such as a remote control, keypad, mouse and the like.

The server 120 operates to receive content streams, application streams and other data from the service providers 110. The server 120 stores the streams for subsequent distribution in a mass storage device (not shown) or propagates the streams towards one or more of the clients 140 via the network 130. The network 130 may comprise an over the air (OTA) transmission system, satellite transmission system and/or cable television transmission system comprising a plurality of channels which may be individually tuned or selected for further processing by the client devices 140.

The client 140 comprises a processor 146 as well as a memory 148 for storing various control programs and other programs. Specifically, the memory 148 is used for library storage 210, class loader 220, library loader 225, virtual machine 230, operating system 240 and various data 250.

In various embodiments, the network 130 may comprise television distribution systems, telecommunications systems, the internet and the like. Higher bandwidth systems are necessary to support video and other high bandwidth services, though lower bandwidth networks such as the public service telephone network (PSTN) may be used to supply less bandwidth intensive services.

The processor 146 cooperates with conventional support circuitry such as power supplies, clock circuits, cache memory and the like as well as circuits that assist in the execution of the software routines stored in the memory 148. The client 140 also contains input/output (I/O) circuitry 142 that forms an interface between the various functional elements communicating with the client 140. Although the client 140 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The client 140 may be operably coupled to a number of devices or systems. For example, the I/O circuit 142 interfaces to the input device 160, network 130 and presentation device 150.

The client 140 operates in one embodiment as a set top box within an information distribution system such as a cable television or satellite distribution system. In a set top box embodiment, it is assumed that the client 140 comprises a device having a relatively limited amount of memory and processing power compared to a full feature desk top computer, lap top computer or server. In a set top box embodiment, the client 140 operates to selectively tune, select, demultiplex, demodulate and/or otherwise process one or more of a plurality of information channels or information streams provided via the network 130. The client 140 may comprise, illustratively, a set top box (STB) such as the model DCT 2000 manufactured by Motorola Corporation of Schaumburg, Ill.

The virtual machine (VM) 230 receives instructions from programs such as applets being interpreted in the form of byte codes. A byte code is essentially a compiled format for a general purpose program, such as a program written in the Java programming language. Once the instructions or byte codes have been received, the VM interprets these byte codes by dynamically converting them into a form for execution, such as object code, and executing them. During execution of byte code associated with an application, the VM may encounter a symbolic reference to an object class that has yet to be loaded. In such a situation, the VM 230 normally delegates the task of loading the appropriate program files to a class loader.

The class loader 220 is invoked when the VM interpreter requires an object class definition that has not yet been loaded. The class loader loads the object class definitions from library storage 210 if the library supporting the desired object class definition is present. The class loader 220 utilizes a classpath parameter associated with an application to identify directories, files and other data structures and/or memory location which may store a library including a desired object class. A classpath is an environmental variable that indicates to the Java VM where to find the class libraries, including user-defined class libraries, associated with a particular application. It is noted that while the classpath environmental variable is described herein with respect to the location of library instantiations, other means of enabling communications between an application and a respective instantiated library portion may be employed. Such other means will be appreciated by those skilled in the art informed by the teachings of the present invention.

The library loader 225 is invoked when a library is to be loaded, or when portions (or all) of a library are to be associated with a particular application. In the present invention, a shared library is used to provide class files for each of a plurality of applications running within respective contexts. The library loader 225 loads the code associated with a shared library from local memory, from a broadcast channel or from some other source as a Jar file. There is only one copy of the library Jar file. For each application requiring object from the shared library, the library loader 225 instantiates (as necessary) a respective instance of the shared library for that application and stores in the respective library instance at least those portions of the shared library necessary for the application. The directory or file (or other pointing information) associated with the respective library instance is appended to the classpath of the respective application. In this manner, the class loader 220 may retrieve the appropriate class files for the application.

Thus, the library loader 225 is adapted to instantiate at least portions of shared libraries for the benefit of respective applications, and adapt the classpath parameter of the respective applications such that the class loader may retrieve the classes contained therein.

Each instance of shared library portions operates within its own context. There are two ways that memory is conserved by using shared libraries. Advantageously, memory is conserved by each context referring to only one copy of the byte codes (i.e., the library data that contains the class byte code is only loaded once). Each instance of a library context can load every class in the library. Moreover, memory is conserved by only loading classes in each context that the associated application refers to (i.e., each library instance's list of loaded library classes changes dynamically as the associated application references and/or dereferences each library class).

The library storage 210 is depicted as including a Library X 212 which includes respective class definitions, methods and the like. Additionally, the library storage 210 is depicted as including Other Libraries 212'. Libraries may be normally resident within the library storage 210 or transitionally resident within the library storage 210. A transitionally resident library may comprise, for example, a library that is available only when an information or content stream associated with a particular service provider is selected. For example, where a particular service provider provides an application including corresponding libraries (e.g., a news service providing a news tracking application and libraries), the application and libraries are received via the selected information stream.

The subject invention is primarily described within the context of a library file in which class files are shared by multiple applications via respective contexts of portions of the library file. It will be appreciated by those skilled in the art and informed by the teachings of the present invention that other data structures (e.g., data files, images and the like) within a library may also be shared in a similar manner. Specifically, when a library is requested by an application, the library instance context is linked to the requesting application context. This association of the two contexts allows the VM to append the library classes to the apps classpath. This mechanism also allows the library data files to be appended to the application's "data path." Generally speaking, a library class, data file or object of any type contained in a library may be processed according to the invention.

In one embodiment of the invention, whether the VM is looking for a class file or a data file (such as an image file), it will look in the application's context first, followed by any library contexts that have been associated with the app due to a library load request. Thus, it will be appreciated that the descriptions of the various embodiments of the invention within the application are applicable to various information elements, including library classes, information or data files (and other data structures), as well as other data types and their corresponding location parameters (i.e., classpath, datapath and the like).

Figure 2:
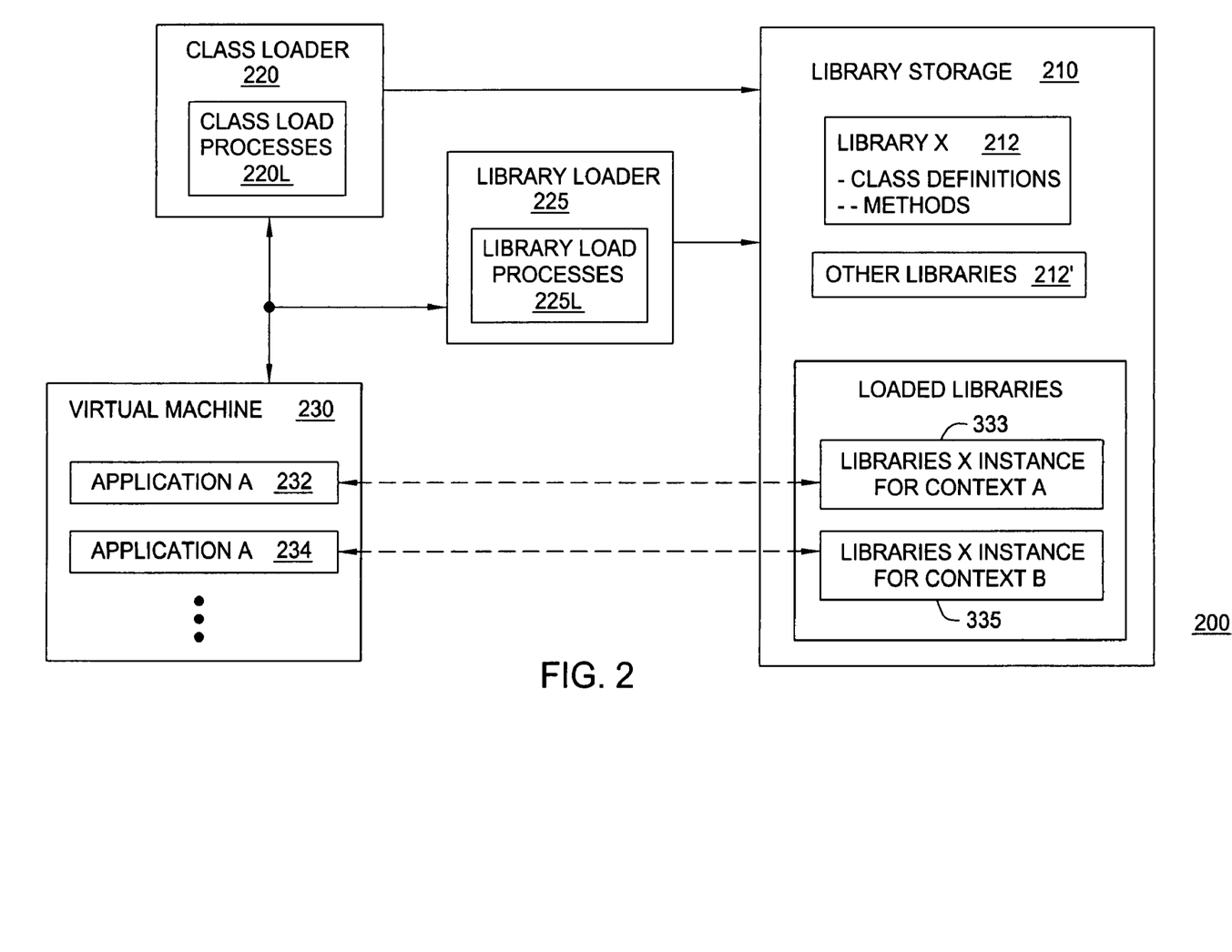
FIG. 2 depicts a high level block diagram illustrating various functions according to an embodiment of the present invention.

FIG. 2 depicts a high level block diagram illustrating various functions according to an embodiment of the present invention. Specifically, FIG. 2 illustrates an embodiment of the invention in which the class loader 220, library loader 225, virtual machine 230 and library storage 210 operate to provide shared library functions to multiple applications operating within respective contexts. In one embodiment, the shared libraries are normally stored within the library storage 210, while in alternate embodiments the shared libraries are broadcast by service providers 110 and are only available in their entireties when the information stream associated with the respective service providers is presently tuned or selected.

Referring to FIG. 2, the virtual machine 230 is depicted as running a first application 232 denoted as application A and a second application 234 denoted as application B. Each of the applications 232, 234 and the like are associated with a respective classpath. A classpath is a list of directories or files which may be searched to find a particular class file. When the VM 230 encounters a new class reference as an application is running, the VM must be able to find the class to invoke its methods and procedures. The VM 230 searches for classes in each directory or file listed in the classpath of an application. Thus, in response to encountering a new class reference, the VM invokes the class loader 220 to retrieve the class from the library containing the class.

In the present invention, where desired classes are contained within a shared library, the library loader 225 uses library load processes 225L to load into an instance of the library associated with the requesting application those classes within the shared library that are requested by the application. That is, that portion (at least) of the shared library code associated with classes requested by an application is included within an instance of the library, which instance itself is created as necessary. Location information such as the file name, directory or memory location of the corresponding instantiated library portion for a particular application is appended to the classpath associated with the particular application. In this manner, the library loader 225 generates a relatively small library including classes which may be accessed for the application via the class loader 220.

While it is contemplated that only portions of the shared library are instantiated into respective library contexts for corresponding applications, it will be appreciated by those skilled in the art that more or even the entirety of a shared library may also be included within a particular library context. This will generally not be desirable due to the amount of memory utilized. However, where the shared library is associated with a bound application (an application that is only available while an associated service provider's information stream is accessible), such that the shared library will not be available after deselecting the applications information stream, it may be desirable to store the bound applications classes while such classes are available.

Figure 3:
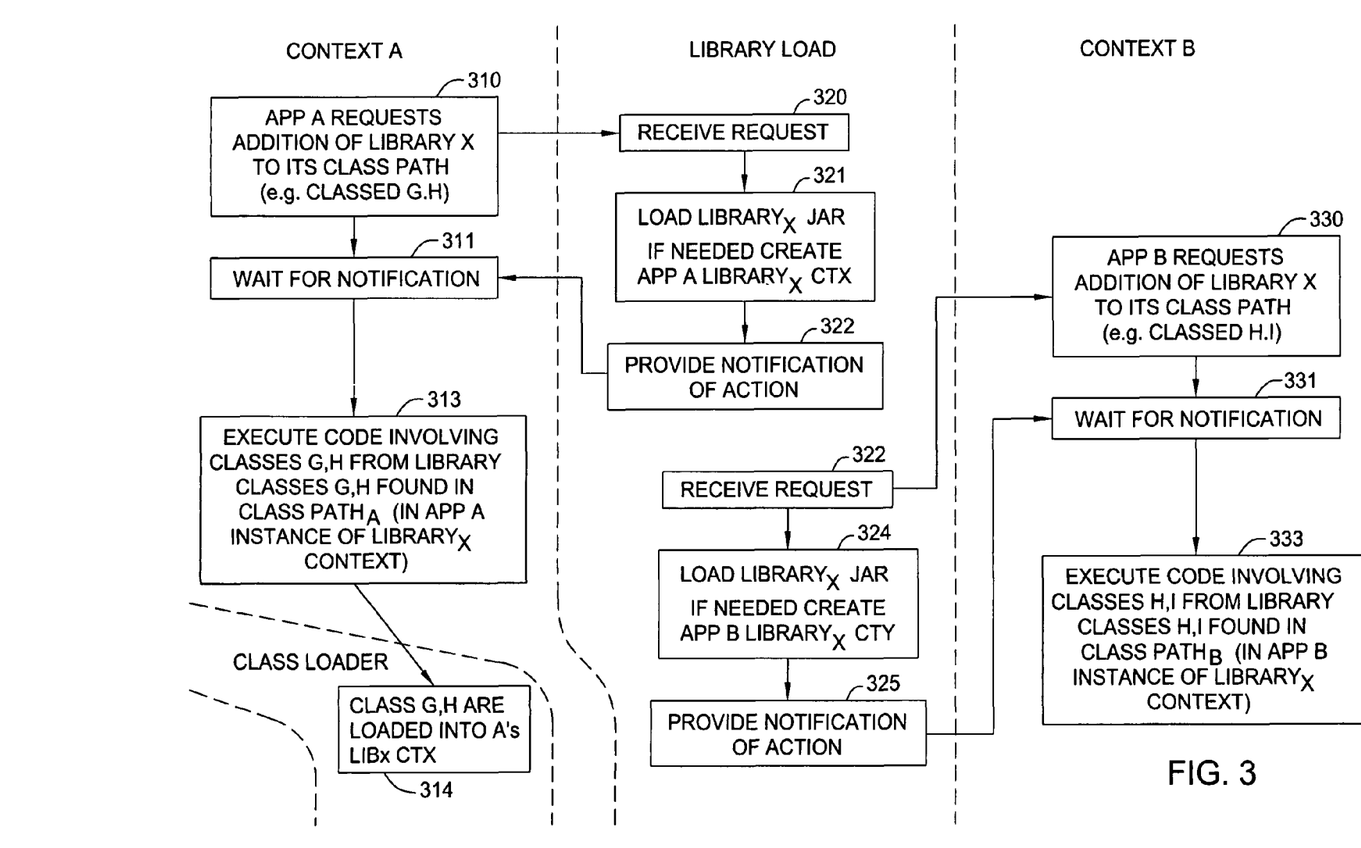
FIG. 3 depicts a flow diagram of a shared library loading process according to an embodiment of the present invention.

FIG. 3 depicts a flow diagram of a shared library loading example according to an embodiment of the present invention. Specifically, FIG. 3 depicts the interaction of two applications (denoted as application A and application B) with a library loader. Each of the applications has byte code being interpreted by the VM 230 within its own respective context. Each of the applications interacts with the library loader 225 via the VM 230 to gain access desired locally stored or broadcast libraries.

Referring to FIG. 3, steps 310-313 are associated with application A (232), which is operating within its own context and the virtual machine 230; step 314 is associated with the class loader 220; steps 320-325 are associated with library loader 225; and steps 330-333 are associated with application B (234) which is operating within its own context on the virtual machine 230.

For purposes of the discussion, it will be assumed that the shared library denoted as Library X includes at least classes G, H and I, wherein classes G and H are required by application A and classes H and I are required by application B.

At step 310, application A requests the addition of Library X to its classpath. That is, at step 310, application A determines that objects or classes (illustratively classes G, H) needed for the interpretation of its byte code are to be found within Library X and the request for the addition of Library X to its classpath is responsively transmitted. Application A thereafter waits for notification of such classpath addition at step 311.

At step 320, the library loader receives the request of step 310. At step 321, the Library X jar file is loaded if necessary, and a new library context is instantiated for application A. The methodology useful in implementing step 321 will be discussed in more detail below with respect to FIG. 4. At step 322, the library loader provides a notification of this action to application A.

At step 311, the notification application A has been waiting for is received, and at step 313, application A executes code involving classes G, H from library classes G, H found in its classpath. In this example, the classpath points to the application A instance of the library X context, which includes classes G, H as loaded at step 321. At step 314 the class loader loads the library classes G and H into the library X context of application A.

At step 330, application B requests the addition of library X to its classpath. That is, at step 330 application B determines that objects or classes needed for the interpretation of its byte code (e.g., classes H, I) are to be found within library X and the request for the addition of library X to its classpath is responsively transmitted. Application B thereafter waits for notification of such addition at step 331.

At step 323, the library loader receives the request of step 330 and, at step 324, the Library X jar file is loaded if necessary and a Library X context of at least the desired classes (classes H, I) is instantiated for application B, the classpath associated with application B is modified to point to the Library X context associated with application B. At step 325, a notification of the classpath modification is provided to application B.

Upon receiving notification from the library loader at step 331, application B proceeds to step 333 where application B executes code involving classes H, I from the shared library classes H, I found via classpath B.

The library loading function (steps 321 and 324) discussed above with respect to FIG. 3 illustrates establishing a respective library context for each application and loading into the respective library context those classes desired by the corresponding application. Where classes within an unloaded library are desired, the jar associated with that library is first loaded or otherwise retrieved, and a new library context including the appropriate set of library classes is established. Where classes within a previously loaded library are desired, then the existing code associated with that library is utilized to establish a new library context including a new appropriate set of library classes.

Figure 4:
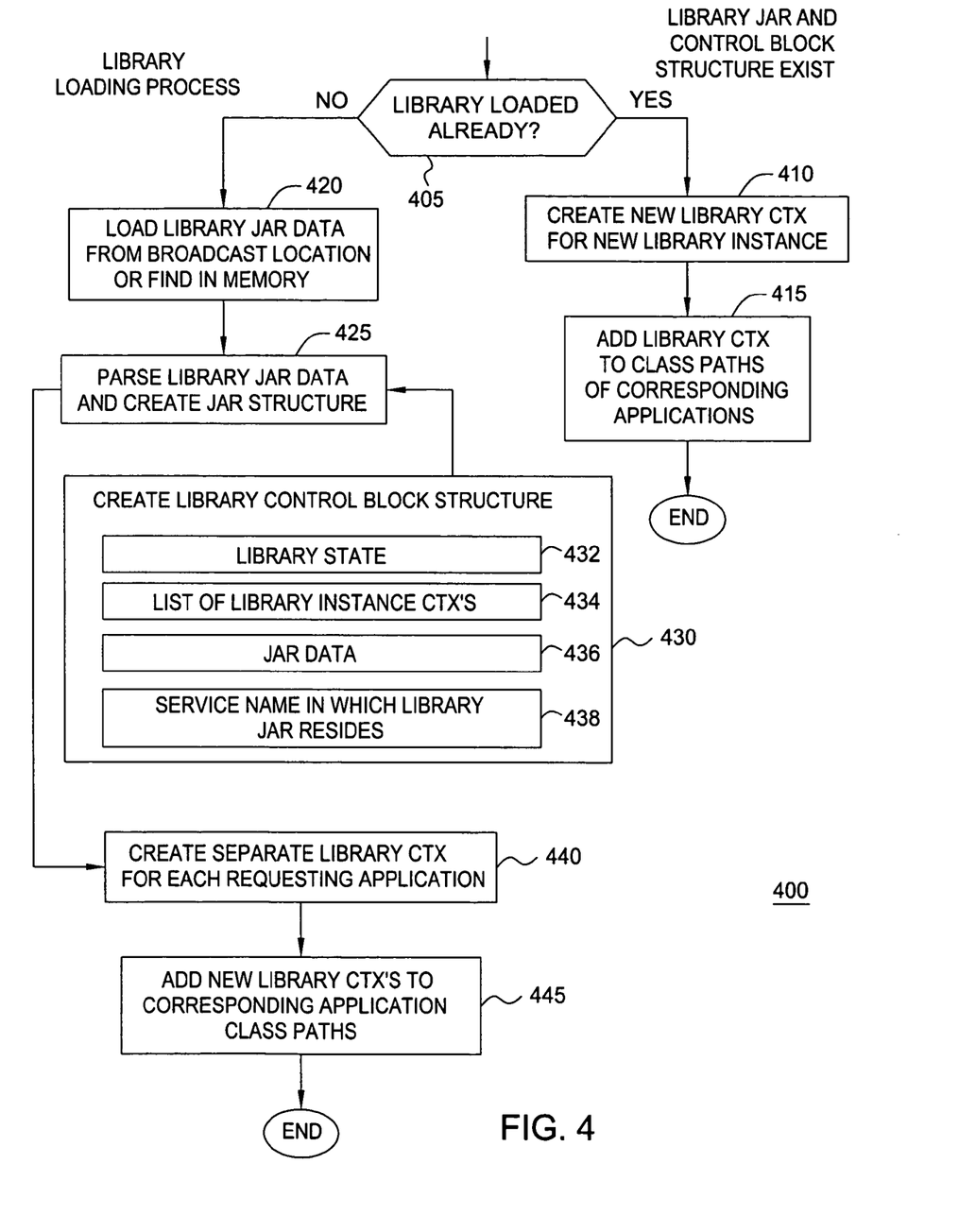
FIG. 4 depicts a library loading process according to an embodiment of the present invention.

FIG. 4 depicts a library loading process according to an embodiment of the present invention. Specifically, the library loading process is suitable for implementing steps 321 and/or 324 within the process 300 of FIG. 3.

The process 400 is entered at step 405 where a determination is made as to whether the desired library has already been loaded. That is, at step 405 a determination is made as to whether, for example, the data or code associated with Library X exists within the library storage 210. If such code does not exist, then the code may be retrieved from an alternate storage source, from a broadcast source or from some other source. In the case of a broadcast source, the library may only be available if the corresponding broadcast channel is presently selected by the client 140. If the desired library has not been loaded (such as with step 321 in FIG. 3), then the process 400 proceeds to step 420. If the desired library has already been loaded (such as with step 324 of FIG. 3), then the process 400 proceeds to step 410.

At step 420, the jar data associated with the desired library is loaded from a broadcast location or local memory. That is, in the case of an application operating upon a set-top box operatively communicating with a plurality of downstream channels, where the desired library jar is carried by a particular downstream channel that is presently selected, the library jar is extracted from the selected downstream channel and stored in local memory. Alternatively, if the jar data has previously been stored in local memory, then its location within local memory is determined.

At step 425, the library jar data within memory is parsed and a jar structure is created. Referring to box 430, a library control block structure is created which includes a library state field 432, a list of library instance contexts field 434, a jar data field 436 and a service name field in which the library jar resides 438. The library state field is a variable used to track the state of the library: and other parameters, such as whether the library is unloaded, loading, loaded, and the like. The library instance list keeps track of how many separate library contexts have been created for this library; that is, how many apps have requested this library been added to its classpath. The jar data filed is the address or other pointing reference to the jar structure created from the loaded library jar data. The service name field is used to identify the service (if any) that this library is associated with.

At step 440, a separate library context for each application requesting classes contained by the library is created. At step 445, the new library contexts are added to the classpaths of the corresponding applications.

Where library jar and control block structure exist (i.e., the library loaded query at step 405 is answered affirmatively), at step 410 new library contexts are created for each new library instance. At step 415, the new library contexts are added to the classpaths of the corresponding applications. After the classpaths of requesting applications are modified to include corresponding library contexts (steps 414 or 445), the library loading process 400 of FIG. 4 is exited.

Figure 5:
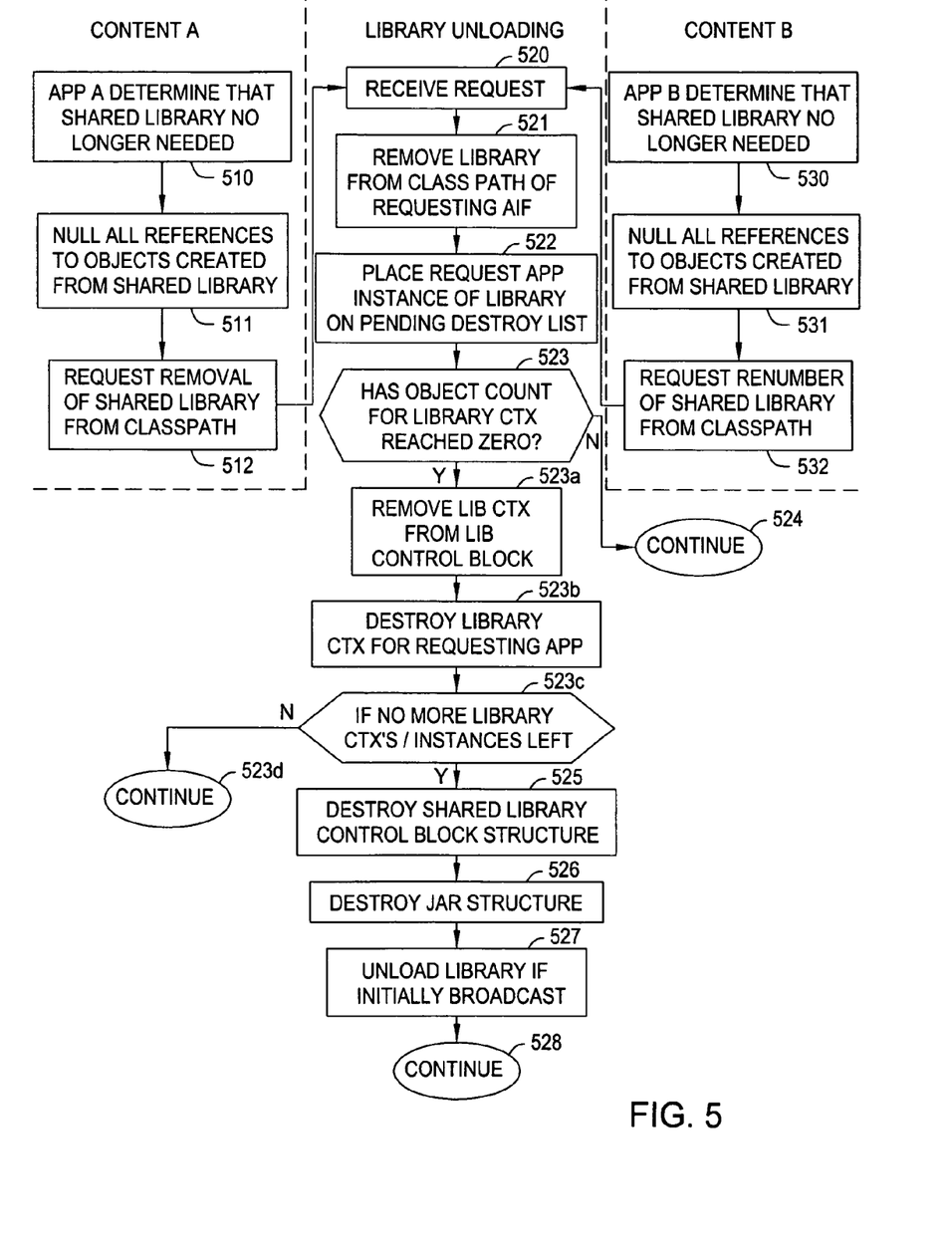
FIG. 5 depicts a flow diagram of a library unloading process according to an embodiment of the present invention.

FIG. 5 depicts a flow diagram of a library unloading process according to an embodiment of the present invention. Specifically, FIG. 5 describes steps taken by two applications (illustratively applications A and B) operating within respective contexts and communicating with a class loader.

At step 510, application A determines that classes associated with a shared library are no longer needed. At step 511, the application nulls all references to objects created using the shared library and, at step 512, requests from the class loader the removal of the shared library from the application A classpath.

At step 530, application B determines that classes associated with a shared library are no longer needed. At step 531, the application nulls all references to objects created using the shared library and, at step 532, request from the class loader the removal of the shared library from the application B classpath.

At step 520, the library loader receives a request to remove a library from one or more classpaths. At step 521, the library is removed from the classpath of the requesting application. At step 522, the instance of the library is placed on a pending destroy list. At step 523, a determination is made as to whether the object count associated with the library has reached zero. That is, at step 523 the class loader determines whether or not all of the objects associated with a library on the pending destroy list have been nulled.

If the object count for the library context has reached zero, then at step 523a this library context is removed from the library control block instance list and at step 523b the instances library context is destroyed. At step 523c, if the library instance list of the library control block has reached zero, then at step 525 the shared library control block structure associated with the library is destroyed. At step 526, the jar structure is destroyed. At step 525, the library is unloaded if the library was initially broadcast. Optionally, where a library stored in local memory is no longer needed, the local memory may be released by erasing the library. If the object count for the library on the destroy list has not reached zero, then the process continues other processing functions at step 523d. Similarly, after unloading the library at step 527, the process continues with other processing functions at step 528.

The library loading processes and other processes discussed herein find particular applicability within the context of a "bound" application. Specifically, an application and/or library may be "bound" to the information stream or channel utilized by its respective service provider such that deselection or detuning of the service provider's information stream results in the application and/or library no longer being available. In one embodiment of the invention, the bound application is immediately torn down upon deselection of the information stream. In other embodiments, the bound application may continue to run within the virtual machine 230, but additional classes and other library functions are no longer available to it. An "unbound" application and/or library provided by a respective service provider persists after deselection or detuning of the service provider's information stream.

A bound service, such as a news network or other broadcast network service, is available when the particular service is tuned or otherwise selected. When the service is selected, the library associated with that service is available and the application associated with that service may be invoked (if not yet invoked) and may retrieve classes from that library by causing the library loader to instantiate respective libraries (including desired classes) within respective library contexts associated with the requesting application. In this manner, applications associated with a bound service (or other applications given rights to the bound service library) may utilize that service and/or its library functions while the service is tuned or otherwise selected.

Upon detuning or deselecting a service, the data of the service is no longer available and the previously loaded library associated with the service may be torn down if no longer needed. In one embodiment of the invention, in response to a set top terminal tuning a communications channel transporting data associated with the bound service, applications utilizing that service are loaded and/or applications having rights to data associated with the bound service (e.g., classes within bound libraries) are made aware of the selection of the service. Requesting applications may then retrieve desired classes from the bound service library in the manner discussed above with respect to FIGS. 3 and 4. Upon detuning or deselecting the bound service channel, applications may be terminated along with the context of their corresponding libraries in the manner discussed above with respect to FIG. 5. That is, upon deselecting a bound service, those classes associated with the bound service are removed from the classpath of the various applications. Existing instances of objects from the bound service library are still available to the applications, though new objects from that library are not available because the library itself is no longer available.

A library loader according to the present invention advantageously enables an application to have classes, loaded from an external jar, appended to the application classpath to allow the library to be unloaded when no longer used. This allows multiple applications to share a common code base and reduces memory usage by being able to unload the class library. In the client functions discussed herein, there is only one instance of the VM running and each application is separated from other applications by being contained in its own context. Each context has its own class list containing only classes from the application jar. With the introduction of libraries, each class library has its own context. If an application successfully requests a library load, then classes from the library's context are appended to the end of the application's classpath. If a second application requests the same library, then it too will have the library's classes appended to its classpath. Any other application currently running in the VM will not have access to these classes unless they request it. Applications can also request the library be removed from their classpath. The library is eligible to be unloaded once all applications that request the library be loaded have since requested the library be unloaded, and all objects that are instances of classes from the library are collected for destruction.

In one embodiment of the invention, applications have libraries loaded automatically before the application itself is loaded. The loading and unloading of such required libraries is conducted in substantially the same manner as described above with respect to FIGS. 3-5. For example, assume that application A requires Libraries X and Y. The list of libraries that are required for an application are available by some mechanism such as configuration information packaged with or associated with Application A, or the like. Prior to loading and running Application A requests are made for the loading of each library from the library loader which, in response, loads the library if it is not loaded already and creates new contexts of the appropriate portions of the library which are then added to application A's classpath. Application A itself is then loaded and is free to use the library classes. The Libraries X and Y are never unloaded, even if application A no longer has references to them until application A itself is unloaded.

Similarly, assume that application B, already loaded, decides to request Library X. Since Library X has already been caused to be loaded by application A, a new library context is created for application B's instance of Library X, and the context of this instance is added to application B's classpath. Application B may request that Library X be removed from its classpath. Application B's context of Library X will eventually be destroyed, but Library X will not be unloaded because application A is still using Library X.

A class unloading procedure in the required library example contemplates that the VM unloads classes from each context (i.e., system context, application context, library context and the like) to free up memory space when the reference count to classes loaded in those contexts reaches zero.

As previously mentioned, some libraries may be associated with a bound service. In this example, when a user tunes to a channel associated with a bound service, the libraries in that service are then made available to be loaded by the various applications running within the VM. Assuming that application A requests a library from a news service such as CNN, the CNN library jar is loaded (if not yet loaded), a library context for application A is created and added to the application A classpath. Application A may then create objects from the library. If the user tunes away from the channel, deselecting the CNN service, then the library context associated with the CNN service is removed from application A's classpath. In this event, application A can no longer reference the CNN library classes that are not already loaded in A's instance of the CNN library context. Application A eventually dereferences all objects created from the CNN library and the context of the CNN library created instantiated on behalf of application A is destroyed. The CNN library jar structure and the control block structure are also destroyed and, eventually, the CNN library jar is unloaded.

It will be appreciated by those skilled in the art informed by the teachings of the present invention that each application may utilize portions of multiple libraries, and that such multiple libraries may comprise bound service libraries, unbound service libraries, default libraries or other libraries. Generally speaking, individual instantiations of portions of multiple libraries may be included in the class path, data path or other location parameter of an application.

Figure 6:
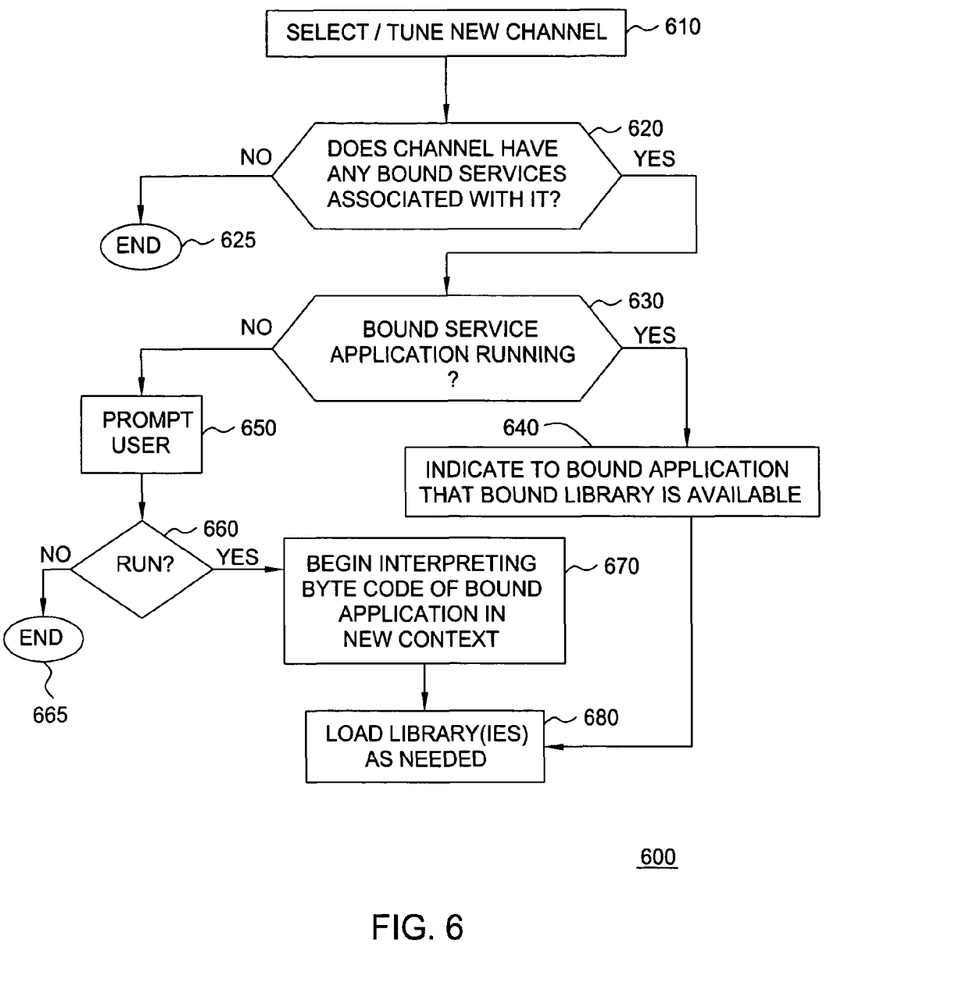
FIG. 6 depicts a flow diagram of a process according to an embodiment of the present invention.

FIG. 6 depicts a flow diagram of a procedure according to an embodiment of the present invention. Specifically, the procedure 600 of FIG. 6 is suitable for use within the context of user navigation among channels offering bound services.

At step 610, a new channel is selected or tuned by a user. At step 620, a query is made as to whether the selected channel has any bound services associated with it. If the query is answered negatively, then the procedure 600 is exited at step 625. If bound services are available, then at step 630 a query is made as to whether a corresponding bound service application is presently running. That is, at step 630 a query is made as to whether an active application within the VM of the client is associated with the bound service of the selected channel.

If a bound service-related application is running, then at step 640 indication is made to the bound application that the bound library is now available. It is noted that the application may have used portions of this library previously, and that such portions may still be included in an instantiated portion of the bound library utilized by the active application. However, should the active application presently need additional portions of the bound library, those portions are now available and the application may be required to retrieve them at this time. At step 680, the bound libraries are loaded as needed as discussed above with respect to FIGS. 3-4.

If no active applications associated with the bound server are present, then at step 650 the user is prompted to run such an application. At step 660, a query is made as to the user's decision. If a user elects not to run such an application, then the procedure 600 is exited at step 665. Otherwise, at step 670 the VM loads the bound application and begins interpreting its byte code in a new context. At step 680, libraries associated with the bound application are also loaded as needed.

Generally speaking, the procedure 600 of FIG. 6 enables a user to initially activate a bound application or continue to utilize a bound application after the bound application went into a dormant state (e.g., due to deselection or detuning of the channel carrying the bound application). In this manner, a "persistence" of a bound application is provided.

Additionally, one skilled in the art will appreciate that although various embodiments of the present invention are described as being practiced in conjunction with a VM, systems, methods, application programming interfaces (APIs) and the like consistent with the present invention may also be practiced in an environment other than a VM environment. For example, the request for a program file (such as a class definition) within a shared library may come from a multithreaded application program module (not shown) running in conjunction with operating system 240 without the need for VM 230.

Furthermore, one skilled in the art will appreciate that all or part of systems and methods consistent with the present invention may be stored on or read from other computer-readable media, such as secondary storage devices (e.g., hard disks, floppy disks, CD-ROM, DVD and the like); a carrier wave received from the Internet or other communications medium; or other forms of ROM or RAM. Finally, although specific components of data processing system have been described, one skilled in the art will appreciate that a data processing system suitable for use with the exemplary embodiment may contain additional or different components, such as multiple processors and a variety of input/output devices. Generally speaking, the systems and methods of the present invention may be practiced in various tangible and intangible media, various computer and data processing systems and the like.

While the foregoing is directed to the preferred embodiment of the present invention, other and further embodiments of the invention may be devised without departing from the basic scope thereof, and the scope thereof is determined by the claims that follow.

What is claimed is:

1. A method enabling access to portions of a library shared by each of a plurality of applications, comprising:
    receiving a first input selecting a communication channel associated with a bound application;
    receiving a request from the bound application for at least one information element in a shared library;
    storing said at least one information element in a library instance associated with the bound application;
    appending, to a location parameter associated with said bound application, a location of said library instance;
    receiving a second input deselecting the communication channel associated with the bound application;
    running the bound application based on the stored at least one information element subsequent to receiving the second input deselecting the communication channel;
    loading a library jar; and
    parsing said library jar and creating therefrom a library control block structure, said control block structure including a library state field, a list of library instance contexts field, a jar data field and a service name field,
    wherein the library state field comprises a variable that tracks the state of the shared library, and
    wherein the list of library instance contexts field tracks a number of library contexts that have been created for the shared library, and
    wherein the jar data field comprises at least one of an address and a pointing reference to a jar structure created from the loaded library jar.

2. The method of claim 1, wherein:
    said information element comprises a class in the shared library; and
    said location parameter comprises a classpath parameter.

3. The method of claim 1, wherein:
    said information element comprises a data file in the shared library; and
    said location parameter comprises a datapath parameter.

4. The method of claim 1, further comprising:
    creating said library instance associated with the bound application.

5. The method of claim 1, wherein:
    said library jar is provided via the communication channel associated with the bound application;
    said step of loading being in response to receiving the first input selecting said communication channel.

6. The method of claim 1, further comprising:
    loading and invoking said bound application in response to receiving the first input selecting said communication channel.

7. The method of claim 1, wherein:
    said application location parameter is associated with a respective instance of a portion of said shared library.

8. The method of claim 1, further comprising:
    destroying an instance of said shared library in response to determining that information elements within the shared library instance are no longer needed.

9. The method of claim 8, further comprising:
    unloading a library in response to a determination that there are no applications using information elements from the library.

10. The method of claim 1, wherein each of a plurality of applications utilizes a respective instantiation of portions of said shared library.

11. The method of claim 1, wherein at least one application utilizes a plurality of instantiations of portions of respective libraries.

12. The method of claim 11, wherein at least one of said instantiations of a respective library portion is associated with an application using a bound service.

13. The method of claim 1, wherein the bound application is running when the request is received.

14. A method for sharing portions of a library, comprising:
    instantiating, for each of a plurality of bound applications requesting information elements from said library, a respective library context including therein a respective requested portion of said library responsive to receiving a first input selecting a communication channel associated with the bound applications;
    said requesting bound applications including location parameters adapted to refer to respective library contexts
    receiving a second input deselecting the communication channel associated with the bound applications;
    running the bound applications based on the instantiated information elements subsequent to receiving the second input deselecting the communication channel; and
    parsing a library jar associated with said library to create therefrom a library control block structure, said library control block structure including a library state field, a list of library instance contexts field, a jar data field and a service name field, wherein the library state field comprises a variable that tracks the state of the shared library, and wherein the list of library instance contexts field tracks a number of library contexts that have been created for the shared library, and wherein the jar data field comprises at least one of an address and a pointing reference to a jar structure created from the library jar.

15. The method of claim 14, wherein:
    said library jar is loaded in response to receiving the first input selecting said communication channel.

16. The method of claim 14, wherein:
    said information elements comprise a class in the shared library; and
    said location parameters comprise a classpath parameter.

17. The method of claim 14, wherein:
    said information elements comprise a data file in the shared library; and
    said location parameters comprise a datapath parameter.

18. A method for navigating a bound service, comprising:
    in response to a selection of a communication channel associated with a bound service, performing the steps of:

retrieving a library jar file from said communication channel;

invoking at least one application associated with said bound service, each of said at least one application having a location parameter pointing to an instance of a shared library associated with said retrieved library jar file that includes at least a respective portion of information elements contained within said shared library;

subsequent to a de-selection of the communication channel, running said at least one application associated with said bound service based on having stored said respective portion of information elements when said communication channel was selected; and parsing said library jar file to create therefrom a library control block structure, said library control block structure including a library state field, a list of library instance contexts field, a jar data field and a service name field, wherein the library state field comprises a variable that tracks the state of the shared library, and wherein the list of library instance contexts field tracks a number of library contexts that have been created for the shared library, and wherein the jar data field comprises at least one of an address and a pointing reference to a jar structure created from loading the library jar file.

19. The method of claim 18, wherein:

said respective portion of information elements comprises at least one of a class in the shared library and a data file in the shared library; wherein said location parameter comprises at least one of a classpath parameter and a datapath parameter.

20. The method of claim 18, further comprising:

destroying those shared library instances including objects no longer needed by corresponding applications.

21. A non-transitory computer readable medium containing instructions for controlling a data processing system to perform:

receiving a first input selecting a communication channel associated with a bound application;

receiving a request from the bound application for at least one information element in a shared library;

storing said at least one information element in a library instance associated with the bound application;

appending, to a location parameter associated with said bound application, a location of said library instance;

receiving a second input deselecting the communication channel associated with the bound application;

running the bound application based on the stored at least one information element subsequent to receiving the second input deselecting the communication channel;

loading a library jar; and parsing said library and creating therefrom a library control block structure, said control block structure including a library state field, a list of library instance contexts field, a jar data field and a service name field, wherein the library state field comprises a variable that tracks the state of the shared library, and wherein the list of library instance contexts field tracks a number of library contexts that have been created for the shared library, and wherein the jar data field comprises at least one of an address and a pointing reference to a jar structure created from the loaded library jar.

22. An apparatus comprising:

a processor; and memory storing instructions that, when executed by the processor, cause the apparatus to perform:

receiving a first input selecting a communication channel associated with a bound application;

receiving a request from the bound application for at least one information element in a shared library;

storing said at least one information element in a library instance associated with the bound application;

appending, to a location parameter associated with said bound application, a location of said library instance;

receiving a second input deselecting the communication channel associated with the bound application;

running the bound application based on the stored at least one information element subsequent to receiving the second input deselecting the communication channel;

loading a library jar; and parsing said library jar and creating therefrom a library control block structure, said control block structure including a library state field, a list of library instance contexts field, a jar data field and a service name field, wherein the library state field comprises a variable that tracks the state of the shared library, and wherein the list of library instance contexts field tracks a number of library contexts that have been created for the shared library, and wherein the jar data field comprises at least one of an address and a pointing reference to a jar structure created from the loaded library jar.

* * * * *